A. K. WAYCOTT.
ROD PACKING.
APPLICATION FILED JUNE 11, 1910.

1,072,679.

Patented Sept. 9, 1913.

Witnesses:
Charles C. Abbe
C. Gassett

Inventor
Albert K. Waycott
By his Attorney
N. T. Criswell

UNITED STATES PATENT OFFICE.

ALBERT K. WAYCOTT, OF NEW YORK, N. Y.

ROD-PACKING.

1,072,679. Specification of Letters Patent. Patented Sept. 9, 1913.

Application filed June 11, 1910. Serial No. 566,397.

*To all whom it may concern:*

Be it known that I, ALBERT K. WAYCOTT, a citizen of the United States, and a resident of New York, county and State of New York, have invented certain new and useful Improvements in Rod-Packings, of which the following is a full, clear, and exact specification.

This invention relates to a class of packings made entirely of metal and adapted for use in connection with steam engines, steam pumps, air compressors, refrigerator plants and the like.

The primary object of the invention is to provide an efficient packing adapted more particularly for use upon piston rods to prevent the escape of air, steam, or other fluid, and which in main structural parts comprises a plurality of rings consisting each of a series of segments so formed that when assembled the packing will conform to the inequalities of the piston rod resulting from wear or otherwise.

Another object of the invention is to provide yielding means for properly holding the segments of the sectional rings when assembled and which will permit said rings to effectually prevent the escape of steam or other fluid under the variations of expansion and contraction of the piston rod at different degrees of temperature, and a further object of the invention is to provide a casing or housing having seating chambers in which one sectional ring is employed instead of a plurality of sectional rings as is usual with packings of this class in ordinary use.

A practical embodiment of the invention is represented in the accompanying drawing forming a part of this specification in which similar characters of reference indicate corresponding parts in all the views, the said invention being more fully described hereinafter and then pointed out in the appended claim.

Figure 1:
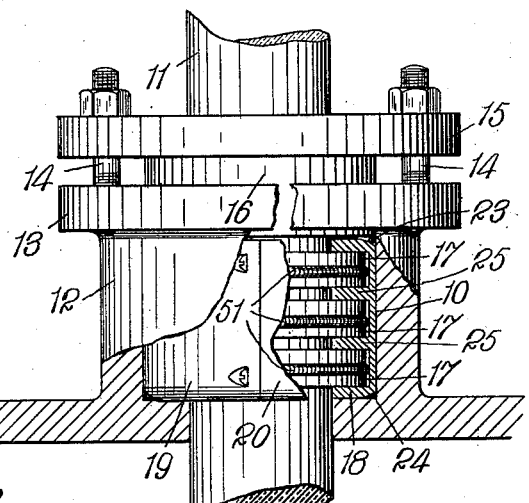
Figure 2:
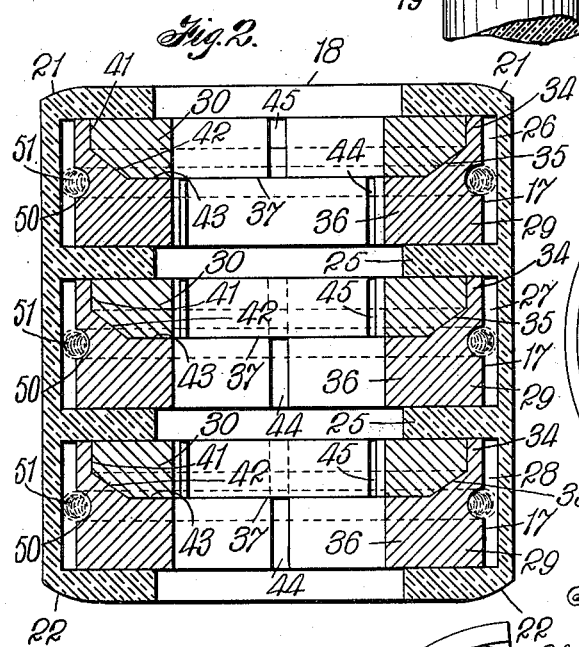
Figure 3:
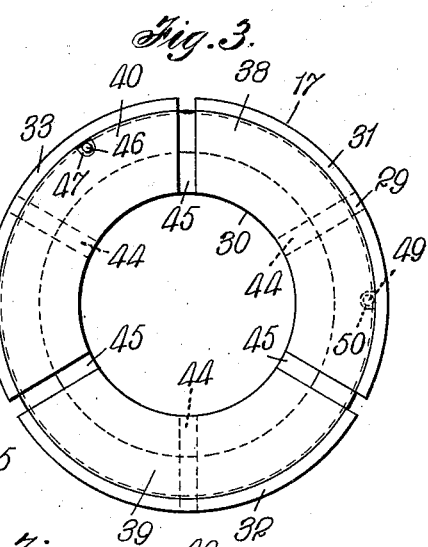
Figure 4:
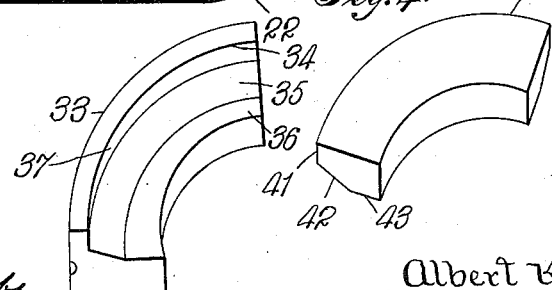

In the drawing, Figure 1 is an elevation of a stuffing box and piston rod, partly fragmentary and partly sectional, showing one form of my packing applied thereto. Fig. 2 is a longitudinal vertical section through the packing. Fig. 3 is a top plan of the rings of the packing when assembled. Fig. 4 represents views, including perspectives of one segment of the outer packing ring and one segment of the inner packing ring.

As an important use of my invention in practice the packing 10 is shown in Fig. 1 applied to a piston rod 11 passing through a stuffing box 12 which may be of the usual or any preferred construction, and having a flange, as at 13, which is engaged by suitable screw bolts 14 held in the flange 15 of a gland 16. By manipulating said bolts and the nuts thereupon the gland 16 may be adjusted to hold the packing 10 in the desired position within the stuffing box 11.

The packing 10 consists mainly of a plurality of sets of sectional rings 17 inclosed within a housing or retaining-case 18. The retaining-case 18 is preferably formed of two parts 19 and 20 to permit the packing to be conveniently assembled and fitted in the stuffing box 11 and around the piston rod 10. The outer surfaces of the retaining-case 18 are peripherally curved, as at 21 and 22, to allow suitable gaskets, 23 and 24, to be interposed between said peripherally curved surfaces and the perimeter of the interior angle of the stuffing box 11 and the peripheral edge of the underside of the gland 16 respectively. Interiorly of the retaining-case 18 are formed circumferential partition walls 25 by which are provided recesses or seating chambers 26, 27, 28. In my present invention I preferably employ a form of the retaining-case 18 wherein each of the seating-chambers 26, 27, 28 will accommodate only one set of the sectional rings 17 and by which the inequalities of the piston rod and wear of the rings are more effectually conformed with to produce perfect steam and fluid-tight bearings than in packings where a plurality of rings are used in each recess of the housing.

Each set of the sectional rings 17 comprise a casing-ring 29 and an inner ring 30. The casing-ring 29 is formed of three segments 31, 32, 33, and each of said segments is provided with a shoulder, as at 34, an interiorly beveled body portion, as 35, and an inwardly disposed bottom part, as 36, thereby providing in the casing-ring 29 when the segments thereof are assembled an annular recess 37 for the reception of the inner ring 30. Each of the inner rings 30 likewise consist of three segments 38, 39, 40, and each segment is formed with an outer straight circumferential surface, as 41, a beveled peripheral outer edge as at 42, and a straight circumferential under surface, as 43. By forming the segments 38, 39, 40 as described, it is clear, that when assembled said segments will form the inner ring 30 which is adapted to fit snugly within the annular recess 37 of each casing ring 29.

In assembling the sectional rings 17 in the recesses 26, 27, 28 of the retaining case 18 and around the piston rod 11 the segments 31, 32, 33 of the casing-ring 29 and the segments 38, 39, 40 of the inner ring 30 are so arranged that the segments of the inner ring 30 will overlap the segments of the casing-ring 29, and to compensate for the wear of the bearing edges of said sectional rings by the reciprocatory movement of the piston rod the segments of both the casing-ring 29 and inner ring 30 are formed so that the opposed ends of each set of segments will be spaced apart, as at 44 and 45. For conveniently arranging the respective segments of the casing-ring 29 and the inner ring 30 as described one of the segments of said casing-ring 29 is provided with a dowel pin 46 which is adapted to register in a notch 47 formed in the outer-edge of one of the segments of the inner ring 30, and oppositely disposed in one of the segments of said inner ring 30 is a dowel pin 48 which is adapted to register in a notch 49 formed in the casing-ring 29.

As the peripheral surface of piston rods often vary in diameter and to allow my packing to conform with such inequalities as well as with the variations resulting from expansion and contraction of the rod under different degrees of temperature a peripheral groove 50 is formed in the outer surface of each wall of the segments 31, 32, 33 of the casing-rings 29, and in said groove is arranged a spiral spring 51 which is directed around the entire circumference of each of said casing-rings, and normally tends to yieldingly force the segments of the casing-ring 29 and inner ring 30 in uniform contact with the surface of the piston rod. Thus from the foregoing it is obvious that a form of packing is provided which is adapted for use upon piston rods and which will effectually prevent the escape of air, steam or other fluid when used in connection with steam engines, steam pumps, air compressors, refrigerator plants and the like.

It is understood that changes may be made in the proportions of the segments forming the rings of my packing or in the shape and proportions of the retaining case and that my packing may be made of any desired material without departing from the spirit and scope of the invention herein illustrated and set forth.

Having thus described my invention, I claim as new and desire to secure by Letters Patent:

In a rod packing, the combination with a stuffing box having a cylindrical chamber therein, and having an annular flange upon the outer peripheral surface thereof, and means for securing an interfitting gland within the said stuffing box and said flange, of a segmental retaining case having a plurality of annular chambers therein, each adapted to receive a segmental packing ring, means for retaining the segments of said retaining case in position and annular flanges for separating the retaining case into compartments and engage the piston rod, means for introducing a gasket in the ends of the stuffing box adjacent to said retaining case, a segmental packing ring in each of said chambers in the retaining case, said packing being composed of three, or more parts having spaced openings between the ends thereof, and a smaller segmental ring composed of three or more parts disposed within the outer ring, and having spaced openings between the ends, said openings alternating between the openings of the outer ring, said outer segmental ring being of a diameter whereby a space is provided between the outer peripheral surface thereof and the inner peripheral surface of the chamber of said gland, said segmental outer ring having a groove in the outer peripheral surface thereof, and a spiral spring seated in said groove circumferentially of said ring, substantially as and for the purposes set forth.

This specification signed and witnessed this tenth day of June A. D. 1910.

ALBERT K. WAYCOTT.

Witnesses:
ROBT. B. ABBOTT,
C. GASSERT.

Copies of this patent may be obtained for five cents each, by addressing the "Commissioner of Patents, Washington, D. C."